US012537450B2

(12) United States Patent
Lo et al.

(10) Patent No.: US 12,537,450 B2
(45) Date of Patent: Jan. 27, 2026

(54) SWITCHING CONVERTER CIRCUIT CAPABLE OF PREVENTING BURST PULSES

(71) Applicant: Richtek Technology Corporation, Zhubei (TW)

(72) Inventors: I-Fang Lo, Keelung (TW); Hung-Yu Cheng, Taipei (TW)

(73) Assignee: Richtek Technology Corporation, Zhubei (TW)

( * ) Notice: Subject to any disclaimer, the term of this patent is extended or adjusted under 35 U.S.C. 154(b) by 192 days.

(21) Appl. No.: 18/584,010

(22) Filed: Feb. 22, 2024

(65) Prior Publication Data

US 2025/0211111 A1 Jun. 26, 2025

(30) Foreign Application Priority Data

Dec. 21, 2023 (TW) .................................. 112146945

(51) Int. Cl.
*H02M 3/158* (2006.01)
*H02M 1/00* (2006.01)

(52) U.S. Cl.
CPC ......... *H02M 3/158* (2013.01); *H02M 1/0035* (2021.05)

(58) Field of Classification Search
CPC ............................. H02M 3/158; H02M 1/0035
See application file for complete search history.

(56) References Cited

U.S. PATENT DOCUMENTS

| 6,166,527 A * | 12/2000 | Dwelley | H02M 3/1582 |
| | | | 323/283 |
| 7,176,667 B2 * | 2/2007 | Chen | H02M 3/1588 |
| | | | 323/283 |
| 9,787,187 B2 * | 10/2017 | Cheng | H02M 1/08 |
| 10,097,079 B1 | 10/2018 | Cheng et al. | |
| 10,644,600 B2 | 5/2020 | Wu et al. | |
| 2011/0156685 A1 * | 6/2011 | Chen | H02M 3/1582 |
| | | | 323/284 |
| 2011/0227550 A1 * | 9/2011 | Walters | H02M 3/1582 |
| | | | 323/283 |
| 2012/0153915 A1 * | 6/2012 | Loikkanen | G05F 1/618 |
| | | | 323/283 |
| 2015/0303807 A1 * | 10/2015 | Garvey | H02M 3/07 |
| | | | 323/271 |
| 2016/0094125 A1 * | 3/2016 | Milanesi | H02M 3/1584 |
| | | | 323/235 |

(Continued)

*Primary Examiner* — Rafael O De Leon Domenech
(74) *Attorney, Agent, or Firm* — Tung & Associates

(57) ABSTRACT

A switching converter circuit for converting an input voltage to an output voltage includes: a feedback compensation circuit for producing a feedback compensation signal according to a difference between a feedback signal related to the output voltage and a reference signal; a modulation circuit for generating a modulation signal in accordance with the feedback compensation signal and a ramp signal; a power stage circuit for switching an inductor according to the modulation signal; and a ramp generator circuit for producing the ramp signal according to the input voltage, the output voltage and the modulation signal. The ramp signal includes: an anterior ramp signal and a posterior ramp signal. An absolute value of a slope of the posterior ramp signal gradually decreases as time increases. A starting time point of the modulation signal is decided by an intersection time point between the posterior ramp signal and the feedback compensation signal.

11 Claims, 9 Drawing Sheets

(56) References Cited

U.S. PATENT DOCUMENTS

| | | | | |
|---|---|---|---|---|
| 2016/0190931 A1* | 6/2016 | Zhang | ................ | H02M 3/1582 |
| | | | | 323/271 |
| 2016/0352228 A1* | 12/2016 | Zhang | .................... | H02M 1/32 |
| 2016/0365790 A1* | 12/2016 | Ye | ....................... | H02M 3/1582 |
| 2017/0346400 A1* | 11/2017 | Li | ....................... | H02M 3/1582 |
| 2018/0358900 A1* | 12/2018 | Sun | .................... | H02M 3/1582 |
| 2019/0131876 A1* | 5/2019 | Luff | ....................... | H02M 1/08 |

* cited by examiner

SWITCHING CONVERTER CIRCUIT CAPABLE OF PREVENTING BURST PULSES

CROSS REFERENCE

The present invention priority to TW patent application No. 112146945, filed on Dec. 21, 2023.

BACKGROUND OF THE INVENTION

Field of Invention

The present invention relates to a switching converter circuit; particularly, it relates to such switching converter circuit capable of preventing unwanted pulses from occurring.

Description of Related Art

The following prior arts are relevant to the present invention: U.S. Pat. No. 10,644,600B2 and U.S. Pat. No. 10,097,079B1.

Please refer to FIG. 1A, which shows a schematic block diagram of a conventional switching converter circuit. As shown in FIG. 1A, the conventional switching converter circuit 901 converts an input power to an output power, wherein the input power includes an input voltage VIN and the output power includes an output voltage VOUT. In the conventional switching converter circuit 901, an error amplifier 924 produces an error amplification signal Eao according to a difference between a feedback signal Vfb related to the output voltage VOUT and a reference signal Vref. A comparator 921 compares the error amplification signal Eao with a ramp signal Vramp, so as to generate a comparison signal Cpo. A logic driver circuit 923 produces a modulation signal Spw in accordance with the comparison signal Cpo and a constant time signal Ct. The modulation signal Spw includes signals Va, Vb, Vc and Vd. A power stage circuit 910 includes switches A, B, C and D and an inductor L. The switches A, B, C and D switch the inductor L according to the signals Va, Vb, Vc and Vd, respectively, thus converting the input power to the output power.

Please refer to FIG. 1B, which illustrates a signal waveform diagram depicting signals associated with the operation of the conventional switching converter circuit of FIG. 1A. FIG. 1B shows the signal waveforms of: the output voltage VOUT, the voltage VLx at a switching node Lx, the inductor current IL flowing through the inductor L, the ramp signal Vramp and the error amplification signal Eao.

The prior art shown in FIG. 1A and FIG. 1B has the following drawbacks. In a case when the conventional switching converter circuit 901 operates in a boost mode and in a discontinuous conduction mode (DCM), because the slope of the ramp signal Vramp has a large absolute value and the slope of the ramp signal Vramp substantially maintains the same, noticeable burst pulses of the inductor current IL will continuously appear, thus resulting in instability of the operation, large ripples of the output voltage VOUT, power loss and low power conversion efficiency.

In view of the above, to overcome the drawbacks in the prior art, the present invention proposes a switching converter circuit capable of preventing unwanted burst pulses from occurring. The switching converter circuit of the present invention is competent in respect of preventing unwanted burst pulses of the inductor current from occurring by adjusting a part of the slopes of the ramp signal and adjusting the final target voltage of the ramp signal by a ramp generator circuit. As a consequence, the switching converter circuit of the present invention is kept stable when operating in DCM, thereby reducing the output voltage ripples and the power loss, and enhancing the power conversion efficiency.

SUMMARY OF THE INVENTION

From one perspective, the present invention provides a switching converter circuit, which is configured to operably convert an input power to an output power, wherein the input power includes an input voltage and the output power includes an output voltage; the switching converter circuit comprising: a feedback compensation circuit, which is configured to operably produce a feedback compensation signal according to a difference between a feedback signal related to the output power and a reference signal; a modulation circuit, which is configured to operably generate a modulation signal in accordance with the feedback compensation signal and a ramp signal; a power stage circuit including a plurality of power switches, wherein the plurality of power switches are configured to operably switch an inductor according to the modulation signal; and a ramp generator circuit, which is configured to operably produce the ramp signal according to the input voltage, the output voltage and the modulation signal, wherein the ramp signal includes an anterior ramp signal and a posterior ramp signal, wherein a slope of the anterior ramp signal and a slope of the posterior ramp signal have opposite signs to each other; wherein an absolute value of the slope of the posterior ramp signal gradually decreases as time increases; wherein a starting time point of the modulation signal is decided by an intersection time point between the posterior ramp signal and the feedback compensation signal.

In one embodiment, the modulation signal is configured to operably turn ON at least one of the plurality of power switches for a constant ON time from the starting time point of the modulation signal.

In one embodiment, a final target voltage of the posterior ramp signal is a voltage which is not equal to zero, wherein during a period in which the power stage circuit does not conduct a switching operation, the posterior ramp signal gradually reaches the final target voltage.

In one embodiment, the final target voltage of the posterior ramp signal is correlated with the output voltage.

In one embodiment, the ramp generator circuit includes: an integration capacitor and an integration resistor, wherein when the switching converter circuit operates in a buck mode, the ramp generator circuit is configured to operably integrate charges in the integration capacitor in accordance with the input voltage, so as to produce the anterior ramp signal, and the ramp generator circuit is configured to operably execute integration to integrate charges in the integration capacitor in accordance with the output voltage, so as to produce the posterior ramp signal.

In one embodiment, the ramp generator circuit further includes: a voltage divider, which is configured to operably superimpose a first voltage at a first end of the voltage divider and a second voltage at a second end of the voltage divider, thus generating a divided voltage; and a plurality of control switches, which are configured to be operably switched according to the modulation signal, so as to decide the first voltage at the first end and the second voltage at the second end of the voltage divider, thereby determining the divided voltage; wherein the integration capacitor and the integration resistor conduct an integration operation according to the divided voltage, thus producing the ramp signal.

In one embodiment, the plurality of power switches include:

a buck high side switch coupled between the input power and a buck switching node; and a buck low side switch coupled between the buck switching node and a ground potential; wherein a first end of the inductor is coupled to the buck switching node; wherein the plurality of control switches of the ramp generator circuit include: a first control switch coupled between the input power and a first control switching node; a second control switch coupled between the first control switching node and the ground potential; a third control switch coupled between the output power and a second control switching node; and a fourth control switch coupled between the second control switching node and the ground potential; wherein the first end of the voltage divider and the second end of the voltage divider are coupled to the first control switching node and the second control switching node, respectively; wherein when the switching converter circuit operates in the buck mode, each of the first control switch and the fourth control switch is switched synchronously with the buck high side switch according to the modulation signal, whereas, each of the second control switch and the third control switch is switched synchronously with the buck low side switch according to the modulation signal.

In one embodiment, the plurality of power switches further include: a boost high side switch coupled between the output power and a boost switching node; and a boost low side switch coupled between the boost switching node and the ground potential; wherein a second end of the inductor is coupled to the boost switching node; wherein in the case when the switching converter circuit operates in the buck mode, the boost high side switch is always ON, whereas, the boost low side switch is always OFF.

In one embodiment, when the switching converter circuit operates in a boost mode, the ramp generator circuit is configured to operably execute integration to integrate charges in the integration capacitor in accordance with a sum of the input voltage plus the output voltage, so as to produce the anterior ramp signal, whereas, the ramp generator circuit is configured to operably execute integration to integrate charges in the integration capacitor in accordance with the output voltage, so as to produce the posterior ramp signal.

In one embodiment, when the switching converter circuit operates in the boost mode, the first control switch is switched synchronously with the boost low side switch according to the modulation signal; the second control switch is switched synchronously with the boost high side switch according to the modulation signal; the fourth control switch is OFF according to the modulation signal; and, the third control switch is ON according to the modulation signal; wherein when the switching converter circuit operates in the boost mode, the buck high side switch is always ON, whereas, the buck low side switch is always OFF.

In one embodiment, the voltage divider is configured to operably decide the final target voltage.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
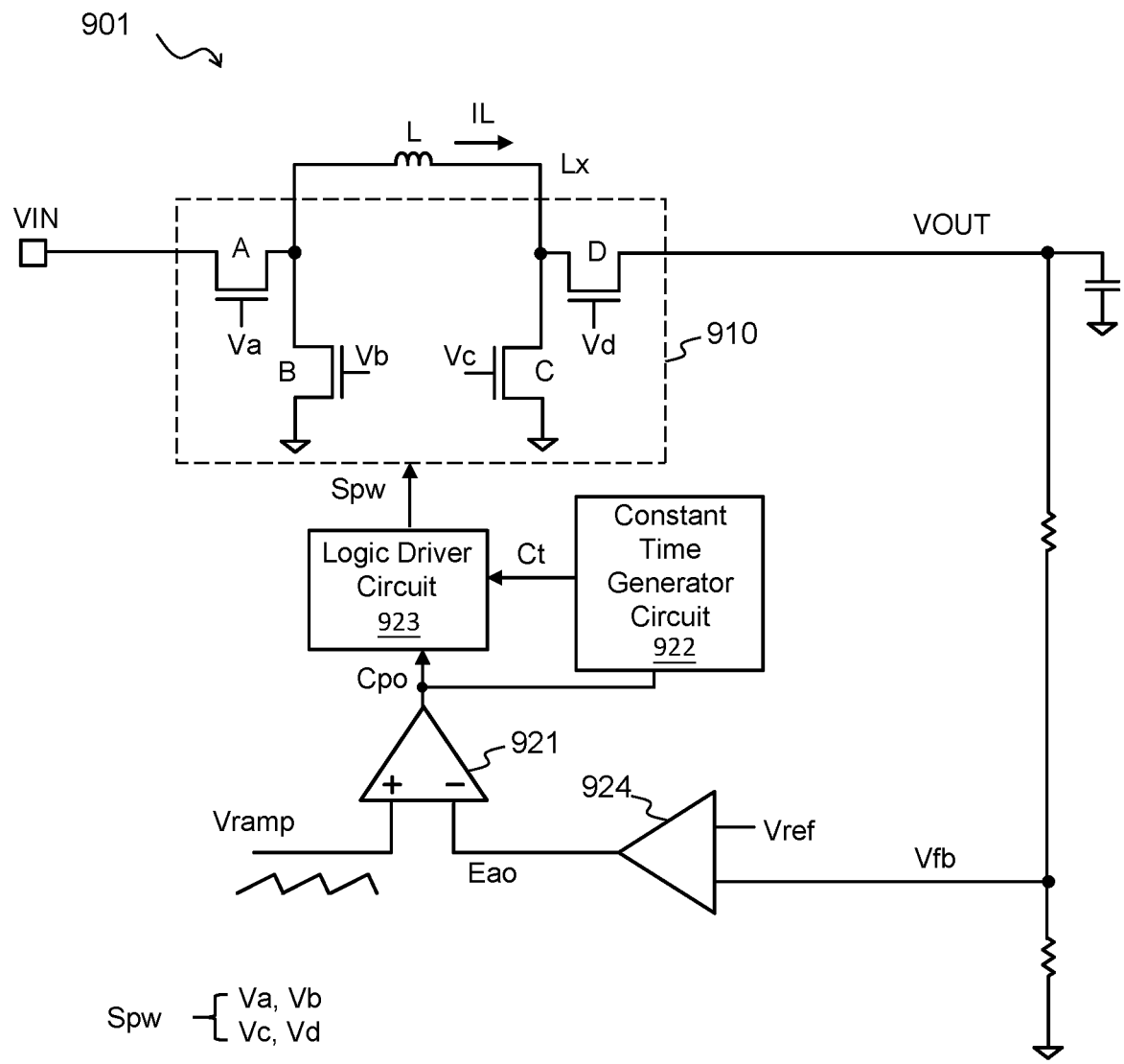
FIG. 1A shows a schematic block diagram of a conventional switching converter circuit.
Figure 1B:
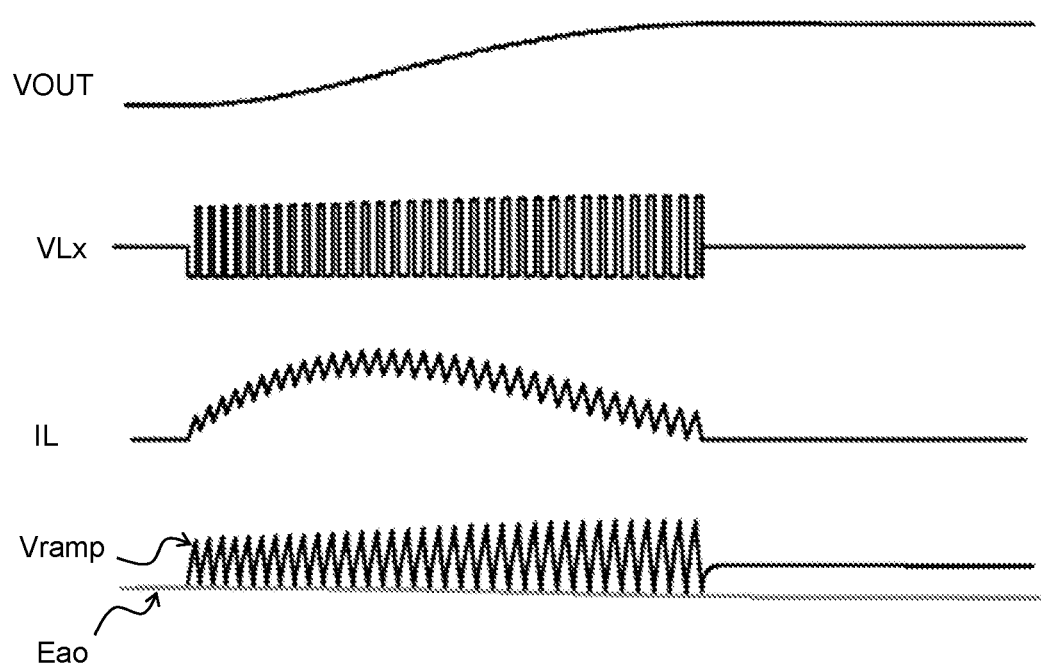
FIG. 1B illustrates a signal waveform diagram depicting signals associated with the operation of the conventional switching converter circuit of FIG. 1A.
Figure 2:
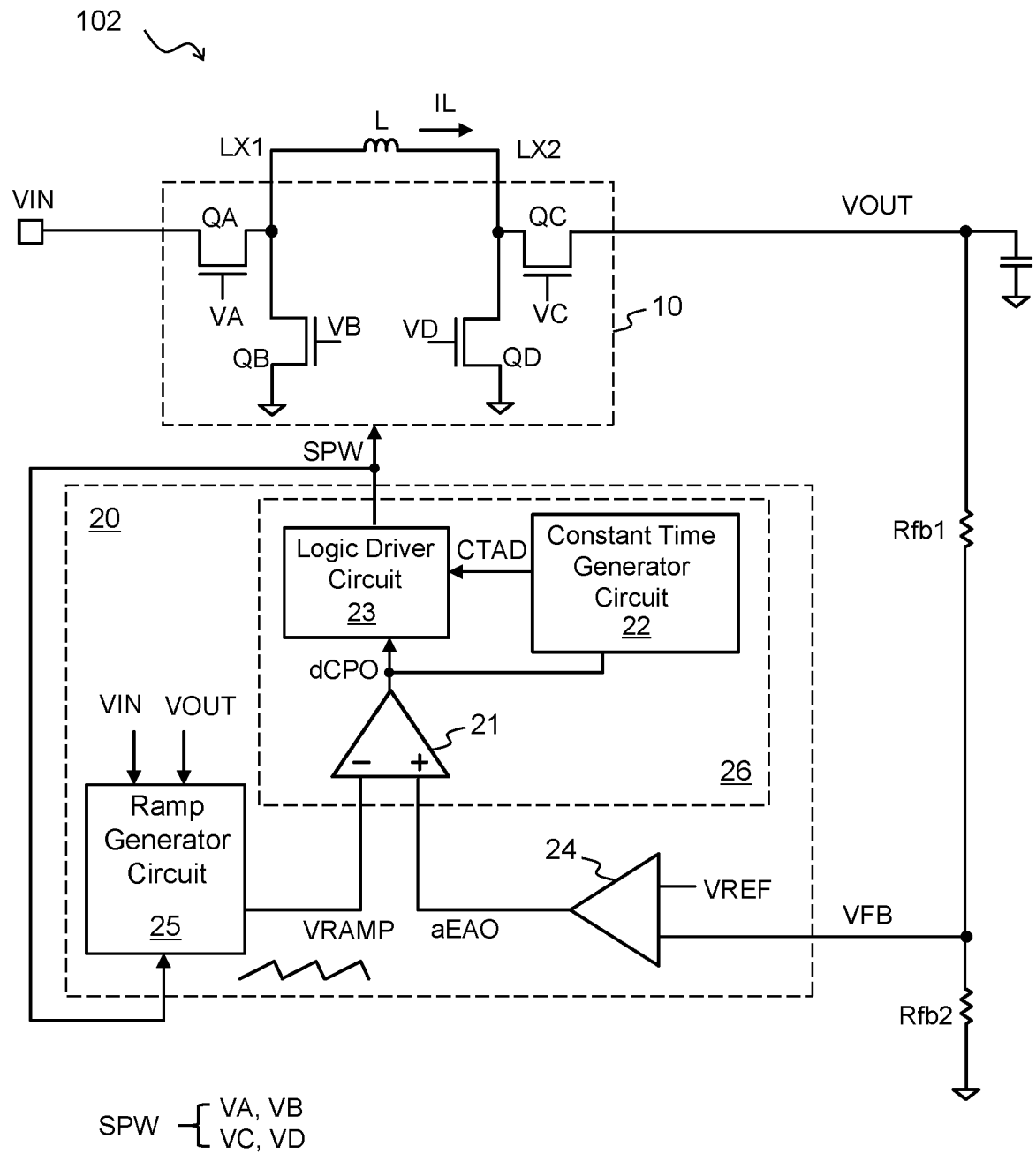
FIG. 2 shows a schematic block diagram of a switching converter circuit according to an exemplary embodiment of the present invention.

FIG. 2 shows a schematic block diagram of a switching converter circuit according to an exemplary embodiment of the present invention. In one embodiment, the switching converter circuit 102 of the present invention is configured to operably convert an input power to an output power, wherein the input power includes an input voltage VIN and the output power includes an output voltage VOUT. In one embodiment, the switching converter circuit 102 comprises: a power stage circuit 10 and a control converter circuit 20. In one embodiment, the control converter circuit 20 includes: a feedback compensation circuit 24, a modulation circuit 26 and a ramp generator circuit 25.

In one embodiment, the feedback compensation circuit 24 is configured to operably produce a feedback compensation signal aEAO according to a difference between a feedback signal VFB related to the output power and a reference signal VREF. In this embodiment, the feedback signal VFB is generated by voltage divider resistors Rfb1 and Rfb2 which divide the output voltage VOUT. In one embodiment, the modulation circuit 26 is configured to operably generate a modulation signal SPW in accordance with the feedback compensation signal aEAO and a ramp signal VRAMP. In one embodiment, the power stage circuit 10 includes plural power switches, wherein the plural power switches are configured to operably switch an inductor L according to the modulation signal SPW, thus converting the input power to the output power.

Please still refer to FIG. 2. In this embodiment, the plural power switches include: a buck high side switch QA, a buck low side switch QB, a boost high side switch QC and a boost low side switch QD. In this embodiment, the buck high side switch QA is coupled between the input power (input voltage VIN) and a buck switching node LX1, whereas, the buck low side switch QB is coupled between the buck switching node LX1 and a ground potential; the boost high side switch QC is coupled between the output power (output voltage VOUT) and a boost switching node LX2, whereas, the boost low side switch QD is coupled between the boost switching node LX2 and the ground potential. In one embodiment, a first end of the inductor L is coupled to the buck switching node LX1, whereas, a second end of the inductor L is coupled to the boost switching node LX2.

In one embodiment, the ramp generator circuit 25 is configured to operably produce the ramp signal VRAMP according to the input voltage VIN, the output voltage VOUT and the modulation signal SPW. In one embodiment, the modulation circuit 26 includes: a comparator 21, a constant time generator circuit 22 and a logic driver circuit 23. In this embodiment, the comparator 21 is configured to compare the feedback compensation signal aEAO with the ramp signal VRAMP, so as to generate a comparison signal dCPO. The constant time generator circuit 22 is configured to count a constant time according to the comparison signal dCPO, so as to generate a constant time signal CTAD. The logic driver circuit 23 is configured to produce the modulation signal SPW in accordance with the comparison signal dCPO and the constant time signal CTAD, so as to control the buck high side switch QA, the buck low side switch QB, the boost high side switch QC and the boost low side switch QD.

Figure 3:
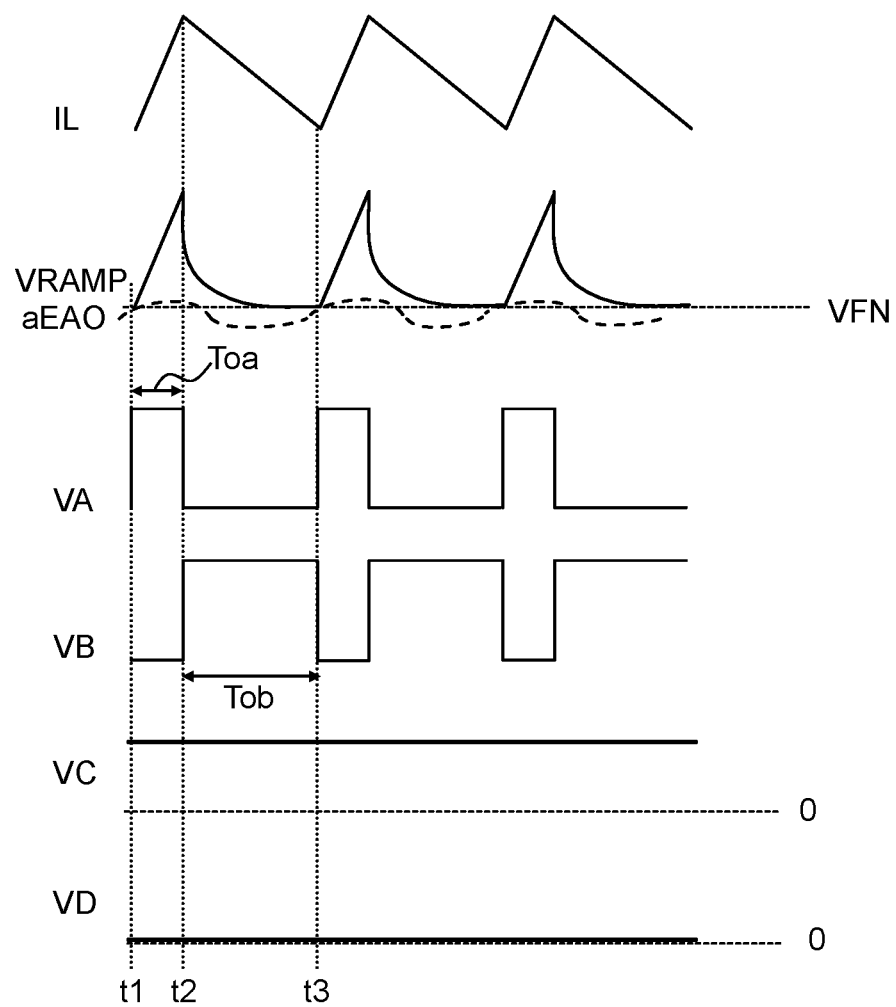
FIG. 3 illustrates a signal waveform diagram depicting signals associated the switching converter circuit of FIG. 2 when operating in a buck mode according to an exemplary embodiment of the present invention.

Please refer to FIG. 2 along with FIG. 3. FIG. 3 illustrates a signal waveform diagram depicting signals associated the switching converter circuit of FIG. 2 when operating in a buck mode according to an exemplary embodiment of the present invention. In one embodiment, the modulation signal SPW includes signals VA, VB, VC and VD, wherein the signals VA, VB, VC and VD are configured to operably control the buck high side switch QA, the buck low side switch QB, the boost high side switch QC and the boost low side switch QD, respectively. In one embodiment, when the switching converter circuit 102 operates in a buck mode, the signal VC controls the boost high side switch QC to be always ON; the signal VD controls the boost low side switch QD to be always OFF; and the signal VA and the signal VB control the buck high side switch QA and the buck low side switch QB according to a duty ratio, respectively.

In one embodiment, as shown in FIG. 3, the ramp signal VRAMP includes an anterior ramp signal and a posterior ramp signal. In this embodiment, the anterior ramp signal corresponds to a rising portion of the ramp signal VRAMP shown in FIG. 3 (e.g., from time point t1 to time point t2 in FIG. 3), whereas, the posterior ramp signal corresponds to a falling portion of the ramp signal VRAMP shown in FIG. 3 (e.g., from time point t2 to time point t3 in FIG. 3). In one embodiment, the slope of the anterior ramp signal and the slope of the posterior ramp signal have opposite signs to each other. In one embodiment, an absolute value of the slope of the posterior ramp signal gradually decreases as time increases. To be more specific, in this embodiment, as shown by the signal waveform of the ramp signal VRAMP in FIG. 3, the falling speed of the posterior ramp signal gradually decreases. In one embodiment, the starting time point of the modulation signal SPW is decided by a time point at which the posterior ramp signal intersects the feedback compensation signal aEAO. In one embodiment, the modulation signal SPW controls at least one of the plural power switches to be ON for a constant ON time from the starting time point of the modulation signal SPW.

In one embodiment, as shown in FIG. 3, the final target voltage VFN of the posterior ramp signal is a voltage which is not equal to zero (e.g., greater than zero), wherein during a period in which the power stage circuit 10 does not conduct a switching operation, the posterior ramp signal gradually reaches the final target voltage VFN. As illustrated by the signal waveform of the inductor current IL in FIG. 3, the switching converter circuit 102 operates in a forced continuous conduction mode (forced CCM) in this embodiment of FIG. 3.

It is worthwhile mentioning that, that the anterior ramp signal corresponds to the rising portion of the ramp signal VRAMP and the posterior ramp signal corresponds to the falling portion of the ramp signal VRAMP in the above-mentioned preferred embodiment are only an illustrative example, but not for limiting the broadest scope of the present invention. In other embodiments, it is also practicable and within the broadest scope of the present invention that the anterior ramp signal can correspond to the falling portion of the ramp signal VRAMP and the posterior ramp signal can correspond to the rising portion of the ramp signal VRAMP.

Figure 4:
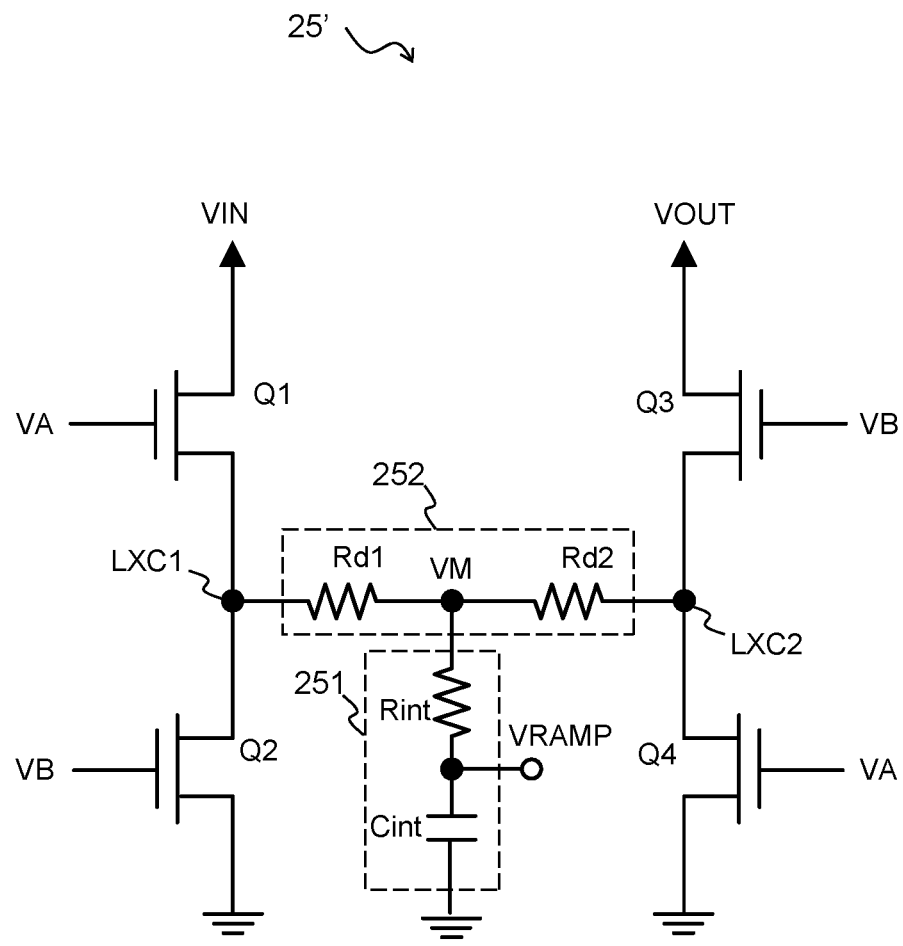
FIG. 4 shows a schematic circuit diagram of a ramp generator circuit in a switching converter circuit according to a specific exemplary embodiment of the present invention.

FIG. 4 shows a schematic circuit diagram of a specific embodiment of a ramp generator circuit in a switching converter circuit according to an exemplary embodiment of the present invention. In one embodiment, as shown in FIG. 4, the ramp generator circuit 25' includes: an integration circuit 251, a voltage divider 252 and plural control switches. In one embodiment, the integration circuit 251 includes: an integration capacitor Cint and an integration resistor Rint, whereas, the voltage divider 252 includes: a resistor Rd1 and a resistor Rd2. In one embodiment, in a case when the switching converter circuit 102 operates in a buck mode, the ramp generator circuit 25' is configured to operably integrate charges in the integration capacitor Cint in accordance with the input voltage VIN to produce the anterior ramp signal, and the ramp generator circuit 25' is configured to operably integrate charges in the integration capacitor Cint in accordance with the output voltage VOUT to produce the posterior ramp signal.

In one embodiment, the plural control switches of the ramp generator circuit 25' include: a first control switch Q1, a second control switch Q2, a third control switch Q3 and a fourth control switch Q4. In one embodiment, the first control switch Q1 is coupled between the input power (input voltage VIN) and a first control switching node LXC1; the second control switch Q2 is coupled between the first control switching node LXC1 and the ground potential; the third control switch Q3 is coupled between the output power (output voltage VOUT) and a second control switching node LXC2; and, the fourth control switch Q4 is coupled between the second control switching node LXC2 and the ground potential. In one embodiment, a first end of the voltage divider 252 and a second end of the voltage divider 252 are coupled to the first control switching node LXC1 and the second control switching node LXC2, respectively. In one embodiment, in a case when the switching converter circuit 102 operates in the buck mode, each of the first control switch Q1 and the fourth control switch Q4 is switched synchronously with the buck high side switch QA according to the signal VA of the modulation signal SPW, whereas, each of the second control switch Q2 and the third control switch Q3 is switched synchronously with the buck low side switch QB according to the signal VB of the modulation signal SPW.

In one embodiment, the voltage divider 252 is configured to linearly superimpose a first voltage at the first end (corresponding to the first control switching node LXC1) of the voltage divider 252 and a second voltage at the second end (corresponding to the second control switching node LXC2) of the voltage divider 252, so as to generate a divided voltage VM. In one embodiment, the plural control switches are configured to be operably switched according to the modulation signal SPW, so as to decide the first voltage at the first end and the second voltage at the second end of the voltage divider 252, thereby determining the divided voltage VM. To elaborate in more detail, in this embodiment, each of the first control switch Q1 and the fourth control switch Q4 is switched in accordance with the signal VA, whereas, each of the second control switch Q2 and the third control switch Q3 is switched in accordance with the signal VB.

Please refer to FIG. 3 along with FIG. 4. In one embodiment, the resistor Rd1 in the voltage divider 252 has a same resistance as the resistance of the resistor Rd2 in the voltage divider 252. In a case when the second control switch Q2 and the third control switch Q3 are ON, while in the meantime the first control switch Q1 and the fourth control switch Q4 are OFF, the divided voltage VM is equal to VIN/2. On the other hand, in a case when the first control switch Q1 and the fourth control switch Q4 are ON, while in the meantime the second control switch Q2 and the third control switch Q3 are OFF, the divided voltage VM is equal to VOUT/2. In one embodiment, the voltage divider 252 serves to determine the final target voltage VEN; that is, the final target voltage VFN of the posterior ramp signal is determined in accordance with the divided voltage VM. In one embodiment, the final target voltage VEN is correlated with the output voltage VOUT. In this embodiment, the final target voltage VFN of the posterior ramp signal is equal to VOUT/2. In one embodiment, the integration capacitor Cint and the integration resistor Rint conduct an integration operation according to the divided voltage VM, thus producing the ramp signal VRAMP.

It is worthwhile mentioning that, on one hand, in the present invention, because the absolute value of the slope of the posterior ramp signal gradually decreases as time increases, unwanted burst pulses of the inductor current IL are suppressed from occurring. On the other hand, by controlling the final target voltage VEN of the posterior ramp signal to be a voltage which is not equal to zero, this also contributes to suppressing unwanted burst pulses of the inductor current IL from occurring. Hence, the switching converter circuit 102 of the present invention can remain stable, and have low power loss and enhanced power conversion efficiency.

From another perspective, in the embodiment shown in FIG. 4, according to the present invention, within an interval Tob wherein the posterior ramp signal is generated (corresponding to an ON time of the signal VB), the integration circuit 251 conducts an integration operation according to a difference between a peak of the ramp signal VRAM and the divided voltage VM (i.e., the final target voltage VEN of the posterior ramp signal), whereby an integration waveform having an exponential correlation with time is generated, and the absolute value of the slope of the posterior ramp signal gradually decreases as time increases. Furthermore, as compared to the prior art, because the difference between the peak of the ramp signal VRAM and the non-zero final target voltage VEN of the posterior ramp signal (e.g., the final target voltage VEN is equal to VOUT/2) is smaller, within the interval Tob wherein the posterior ramp signal is generated, the feature that "the absolute value of the slope of the posterior ramp signal being gradually decreased as time increases" is more noticeable in the present invention.

On the other hand, within an interval Toa wherein the anterior ramp signal is generated (corresponding to an ON time of the signal VA), as compared to the posterior ramp signal, the difference between the input voltage VIN and the final target voltage VFN of the posterior ramp signal (which is approximately equal to a valley of the ramp signal VRAM) is relatively larger. Hence, when the interval Toa is relatively small, the slope of the anterior ramp signal is much steeper than that of the posterior ramp signal, and its waveform is approximately a straight line.

Figure 5:
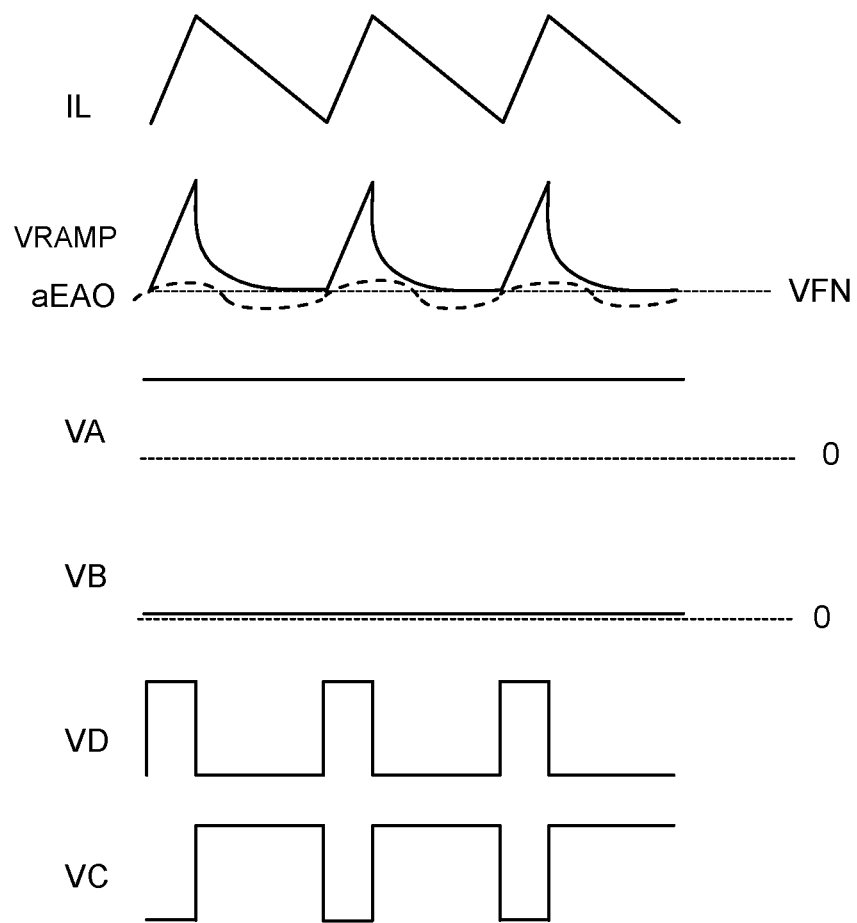
FIG. 5 illustrates a signal waveform diagram depicting signals associated with the switching converter circuit of FIG. 2 when operating in a boost mode according to an exemplary embodiment of the present invention.

Please refer to FIG. 2 along with FIG. 5. FIG. 5 illustrates a signal waveform diagram depicting signals associated with the switching converter circuit of FIG. 2 when operating in a boost mode according to an exemplary embodiment of the present invention. In one embodiment, as shown in FIG. 5, in a situation wherein the switching converter circuit 102 operates in a boost mode, the signal VA controls the buck high side switch QA to be always ON; the signal VB controls the buck low side switch QB to be always OFF; and, the signal VC and the signal VD control the boost high side switch QC and the boost low side switch QD to switch according to a duty ratio, respectively.

The signal waveform diagram of the ramp signal VRAMP of this embodiment shown in FIG. 5 is similar to the signal waveform diagram of the ramp signal VRAMP of the embodiment shown in FIG. 3. To be more specific, the ramp signal VRAMP shown in FIG. 5 also includes an anterior ramp signal and a posterior ramp signal, wherein the anterior ramp signal corresponds to the rising portion of the ramp signal VRAMP shown in FIG. 5, and the posterior ramp signal corresponds to the falling portion of the ramp signal VRAMP shown in FIG. 5. In regard to the details and features of the ramp signal VRAMP shown in FIG. 5, please refer to the detailed description of the embodiment shown in FIG. 3, which are not redundantly repeated here.

Figure 6:
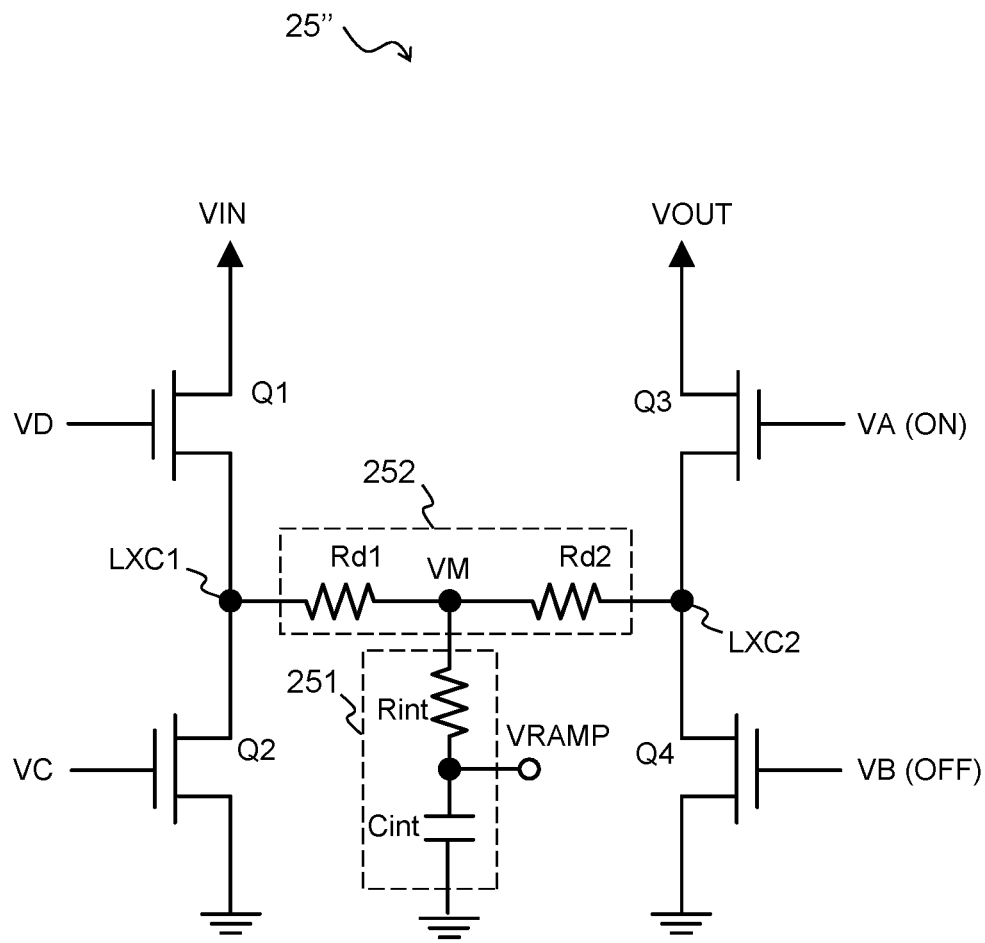
FIG. 6 shows a schematic circuit diagram of a ramp generator circuit in a switching converter circuit according to another specific exemplary embodiment of the present invention.

FIG. 6 shows schematic circuit diagram of a ramp generator circuit in a switching converter circuit according to another specific exemplary embodiment of the present invention. The ramp generator circuit 25" of this embodiment shown in FIG. 6 is similar to the ramp generator circuit 25' of the embodiment shown in FIG. 4, but is different in that: as compared to the ramp generator circuit 25' of the embodiment shown in FIG. 4, in the embodiment shown in FIG. 6, in a boost mode, the ramp generator circuit 25" generates the anterior ramp signal by executing an integration operation to integrate charges in the integration capacitor Cint in accordance with a sum of the input voltage VIN plus an output voltage VOU, whereas, the ramp generator circuit 25" generates the posterior ramp signal by executing an integration operation to integrate charges in the integration capacitor Cint in accordance with the output voltage VOUT.

Please still refer to FIG. 6. In one embodiment, in a case when the switching converter circuit 102 operates in the boost mode, the first control switch Q1 is switched synchronously with the boost low side switch QD according to the signal VD of the modulation signal SPW; the second control switch Q2 is switched synchronously with the boost high side switch QC according to the signal VC of the modulation signal SPW; the third control switch Q3 is ON according to the signal VA; and, the fourth control switch Q4 is OFF according to the signal VB.

Please refer to FIG. 5 along with FIG. 6. In one embodiment, the resistor Rd1 in the voltage divider 252 has a same resistance as the resistance of the resistor Rd2 in the voltage divider 252. When the first control switch Q1 is ON, while in the meantime the second control switch Q2 is OFF, the divided voltage VM is equal to (VOUT+VIN)/2. On the other hand, when the first control switch Q1 is OFF, while in the meantime the second control switch Q2 is ON, the divided voltage VM is equal to VOUT/2. In this embodiment, the final target voltage VEN of the posterior ramp signal is equal to VOUT/2.

Figure 7A:
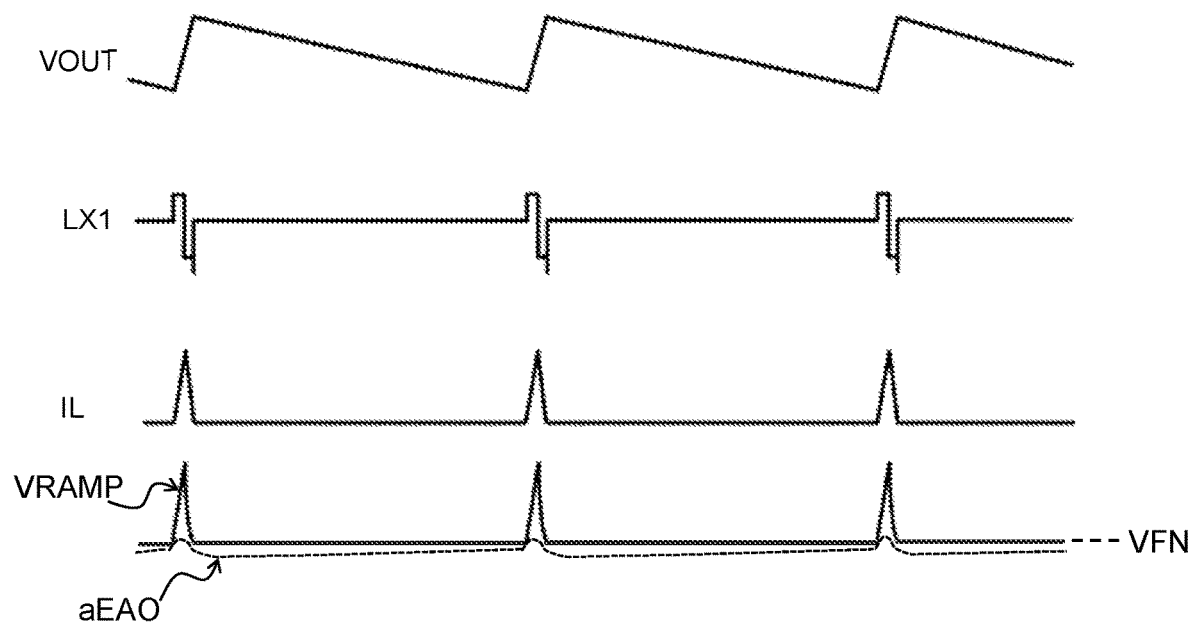
FIG. 7A illustrates a signal waveform diagram depicting signals associated with the switching converter circuit of FIG. 2 when operating in a buck mode according to an exemplary embodiment of the present invention.
Figure 7B:
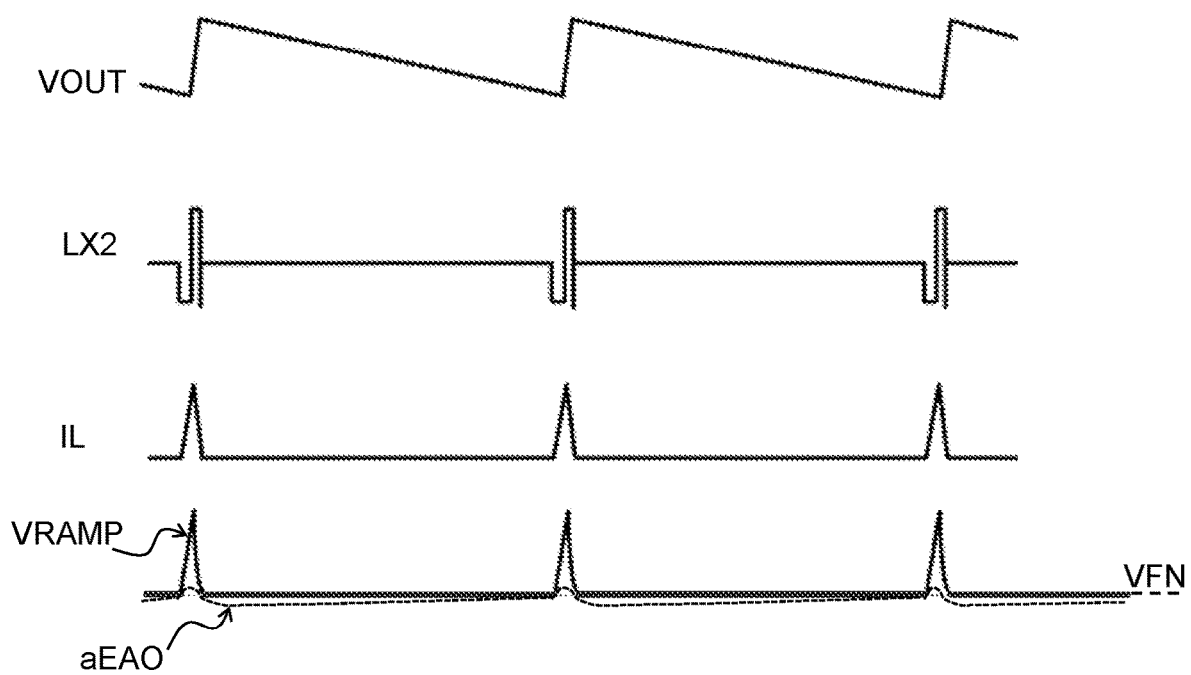
FIG. 7B illustrates a signal waveform diagram depicting signals associated with the switching converter circuit of FIG. 2 when operating in a boost mode according to an exemplary embodiment of the present invention.

Please refer to FIG. 7A and FIG. 7B. FIG. 7A illustrates a signal waveform diagram depicting signals associated with the switching converter circuit of FIG. 2 when operating in a buck mode according to an exemplary embodiment of the present invention. FIG. 7B illustrates a signal waveform diagram depicting signals associated with the switching converter circuit of FIG. 2 when operating in a boost mode according to an exemplary embodiment of the present invention. In one embodiment, as shown in FIG. 7A and FIG. 7B, when a load current is relatively small, the switching converter circuit 102 of the present invention is capable of operating in a discontinuous conduction mode (DCM). As described above, because the absolute value of the slope of the posterior ramp signal gradually decreases as time increases and because the final target voltage VFN of the posterior ramp signal is a voltage which is not equal to zero (e.g., the final target voltage VFN of the posterior ramp signal can be equal to ½-fold of the output voltage VOUT), the switching converter circuit 102 of the present invention is well competent in respect of preventing unwanted burst pulses of the inductor current IL from occurring; hence, the switching converter circuit 102 of the present invention can stably operate in the DCM and reduce the ripple effect of the output voltage VOUT, with low conduction loss and switching loss and enhanced power conversion efficiency.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching converter circuit, which is configured to operably convert an input power to an output power, wherein the input power includes an input voltage and the output power includes an output voltage; the switching converter circuit comprising:
a feedback compensation circuit, which is configured to operably produce a feedback compensation signal according to a difference between a feedback signal related to the output power and a reference signal;
a modulation circuit, which is configured to operably generate a modulation signal in accordance with the feedback compensation signal and a ramp signal;
a power stage circuit including a plurality of power switches, wherein the plurality of power switches are configured to operably switch an inductor according to the modulation signal, thus converting the input power to the output power; and
a ramp generator circuit, which is configured to operably produce the ramp signal according to the input voltage, the output voltage and the modulation signal, wherein the ramp signal includes an anterior ramp signal and a posterior ramp signal, wherein a slope of the anterior ramp signal and a slope of the posterior ramp signal have opposite signs to each other;
wherein an absolute value of the slope of the posterior ramp signal gradually decreases as time increases;
wherein a starting time point of the modulation signal is decided by an intersection time point between the posterior ramp signal and the feedback compensation signal.

2. The switching converter circuit as claimed in claim 1, wherein the modulation signal is configured to operably turn ON at least one of the plurality of power switches for a constant ON time from the starting time point of the modulation signal.

3. The switching converter circuit as claimed in claim 1, wherein a final target voltage of the posterior ramp signal is a voltage which is not equal to zero, wherein during a period in which the power stage circuit does not conduct a switching operation, the posterior ramp signal gradually reaches the final target voltage.

4. The switching converter circuit as claimed in claim 3, wherein the final target voltage of the posterior ramp signal is correlated with the output voltage.

5. The switching converter circuit as claimed in claim 4, wherein the ramp generator circuit includes: an integration capacitor and an integration resistor, wherein when the switching converter circuit operates in a buck mode, the ramp generator circuit is configured to operably integrate charges in the integration capacitor in accordance with the input voltage, so as to produce the anterior ramp signal, and the ramp generator circuit is configured to operably execute integration to integrate charges in the integration capacitor in accordance with the output voltage, so as to produce the posterior ramp signal.

6. The switching converter circuit as claimed in claim 5, wherein the ramp generator circuit further includes:
a voltage divider, which is configured to operably superimpose a first voltage at a first end of the voltage divider and a second voltage at a second end of the voltage divider, thus generating a divided voltage; and
a plurality of control switches, which are configured to be operably switched according to the modulation signal, so as to decide the first voltage at the first end and the second voltage at the second end of the voltage divider, thereby determining the divided voltage;

wherein the integration and the integration resistor conduct an integration operation according to the divided voltage, thus producing the ramp signal.

7. The switching converter circuit as claimed in claim 6, wherein the plurality of power switches include:
a buck high side switch coupled between the input power and a buck switching node; and
a buck low side switch coupled between the buck switching node and a ground potential;
wherein a first end of the inductor is coupled to the buck switching node;
wherein the plurality of control switches of the ramp generator circuit include:
a first control switch coupled between the input power and a first control switching node;
a second control switch coupled between the first control switching node and the ground potential;
a third control switch coupled between the output power and a second control switching node; and
a fourth control switch coupled between the second control switching node and the ground potential;
wherein the first end of the voltage divider and the second end of the voltage divider are coupled to the first control switching node and the second control switching node, respectively;
wherein when the switching converter circuit operates in the buck mode, each of the first control switch and the fourth control switch is switched synchronously with the buck high side switch according to the modulation signal, whereas, each of the second control switch and the third control switch is switched synchronously with the buck low side switch according to the modulation signal.

8. The switching converter circuit as claimed in claim 7, wherein the plurality of power switches further include:
a boost high side switch coupled between the output power and a boost switching node; and
a boost low side switch coupled between the boost switching node and the ground potential;
wherein a second end of the inductor is coupled to the boost switching node;
wherein when the switching converter circuit operates in the buck mode, the boost high side switch is always ON, whereas, the boost low side switch is always OFF.

9. The switching converter circuit as claimed in claim 8, wherein when the switching converter circuit operates in a boost mode, the ramp generator circuit is configured to operably execute integration to integrate charges in the integration capacitor in accordance with a sum of the input voltage plus the output voltage, so as to produce the anterior ramp signal, whereas, the ramp generator circuit is configured to operably execute integration to integrate charges in the integration capacitor in accordance with the output voltage, so as to produce the posterior ramp signal.

10. The switching converter circuit as claimed in claim 9, wherein when the switching converter circuit operates in the boost mode, the first control switch is switched synchronously with the boost low side switch according to the modulation signal; the second control switch is switched synchronously with the boost high side switch according to the modulation signal; the fourth control switch is OFF according to the modulation signal; and, the third control switch is ON according to the modulation signal;
wherein when the switching converter circuit operates in the boost mode, the buck high side switch is always ON, whereas, the buck low side switch is always OFF.

11. The switching converter circuit as claimed in claim 6, wherein the voltage divider is configured to operably decide the final target voltage.

* * * * *